(12) United States Patent
Herges et al.

(10) Patent No.: US 7,883,559 B2
(45) Date of Patent: Feb. 8, 2011

(54) SYSTEM FOR GAS CLEANING

(75) Inventors: Knut Herges, Spiesen-Elversberg (DE); Ralf Wnuk, Bexbach/Kleinottweiler (DE)

(73) Assignee: Hydac Process Technology GmbH, Neunkirchen (DE)

( * ) Notice: Subject to any disclaimer, the term of this patent is extended or adjusted under 35 U.S.C. 154(b) by 193 days.

(21) Appl. No.: 12/083,945

(22) PCT Filed: Sep. 9, 2006

(86) PCT No.: PCT/EP2006/008805
§ 371 (c)(1), (2), (4) Date: Apr. 22, 2008

(87) PCT Pub. No.: WO2007/073783
PCT Pub. Date: Jul. 5, 2007

(65) Prior Publication Data
US 2009/0223186 A1    Sep. 10, 2009

(30) Foreign Application Priority Data
Dec. 24, 2005 (DE) .................. 10 2005 062 245

(51) Int. Cl.
*B01D 50/00* (2006.01)

(52) U.S. Cl. ............... 55/337; 55/315; 55/317; 55/423; 55/486; 55/459.1; 55/DIG. 17; 95/268

(58) Field of Classification Search .......... 95/268; 55/315, 317, 423, 486, DIG. 17, 459.1, 337, 55/440, 487

See application file for complete search history.

(56) References Cited

U.S. PATENT DOCUMENTS

| | | | | |
|---|---|---|---|---|
| 1,915,987 A * | 6/1933 | Fisher et al. | ............ | 95/214 |
| 3,386,230 A * | 6/1968 | Riesberg et al. | ............ | 55/337 |
| 3,753,337 A * | 8/1973 | Shaw et al. | ............ | 96/297 |
| 4,086,070 A * | 4/1978 | Argo et al. | ............ | 95/278 |
| 4,468,239 A | 8/1984 | Frantz | | |
| 4,516,994 A | 5/1985 | Kocher | | |
| 4,692,175 A * | 9/1987 | Frantz | ............ | 96/408 |
| 5,385,592 A * | 1/1995 | Maeda | ............ | 55/323 |
| 6,350,299 B1 * | 2/2002 | Dekker et al. | ............ | 95/268 |
| 7,285,149 B2 * | 10/2007 | Fornof et al. | ............ | 55/385.3 |
| 7,332,009 B2 * | 2/2008 | Casey et al. | ............ | 55/423 |
| 2001/0005986 A1 | 7/2001 | Matsubara et al. | | |
| 2004/0089153 A1 * | 5/2004 | Burns et al. | ............ | 95/268 |

(Continued)

FOREIGN PATENT DOCUMENTS

DE    28 30 808 A1    1/1980

(Continued)

*Primary Examiner*—Jason M Greene
*Assistant Examiner*—Dung Bui
(74) *Attorney, Agent, or Firm*—Roylance, Abrams, Berdo & Goodman, LLP

(57) ABSTRACT

A system for gas cleaning has at least one casing (1) with a first chamber (31) into which the gas to be cleaned can be flowed and with a second chamber (33) from which the cleaned gas exits. A filter device (35) can have the gas flow through it and can be arranged between the chambers. The filter device has filter media both for the separation of solid particles and for dehumidifying the gas by separating out coalesced liquid. The system has, upstream of the filter device (35), an arrangement (11, 37) for preliminary dehumidification of the gas.

18 Claims, 3 Drawing Sheets

U.S. PATENT DOCUMENTS

| | | | | |
|---|---|---|---|---|
| 2005/0092179 | A1* | 5/2005 | Barnwell | 95/273 |
| 2005/0204917 | A1* | 9/2005 | Haland et al. | 95/268 |
| 2005/0235617 | A1* | 10/2005 | Read | 55/423 |
| 2007/0028571 | A1* | 2/2007 | Barratt | 55/423 |

FOREIGN PATENT DOCUMENTS

| | | |
|---|---|---|
| DE | 297 00 579 U1 | 3/1997 |
| DE | 693 08 959 T2 | 3/1997 |
| DE | 198 82 158 T1 | 9/1998 |
| DE | 100 19 293 A1 | 10/2001 |
| EP | 1 275 432 A1 | 1/2003 |
| JP | 05 141815 A | 6/1993 |
| JP | 08 144733 A | 6/1996 |
| WO | WO 2004/067148 A2 | 8/2004 |

* cited by examiner

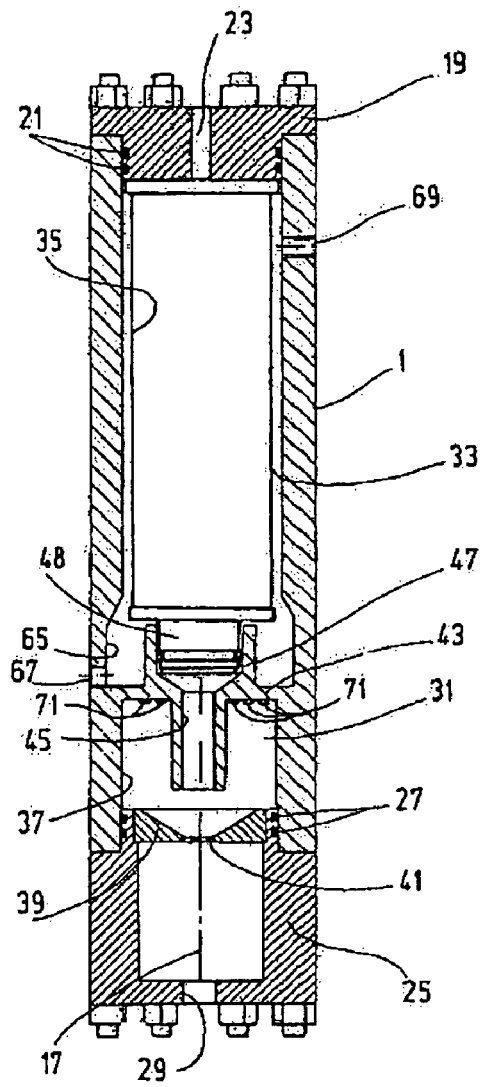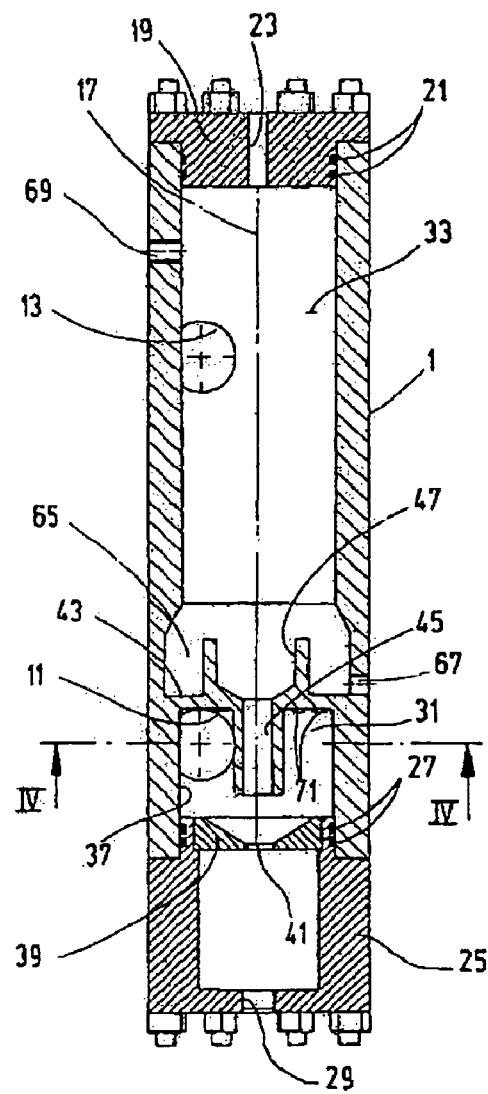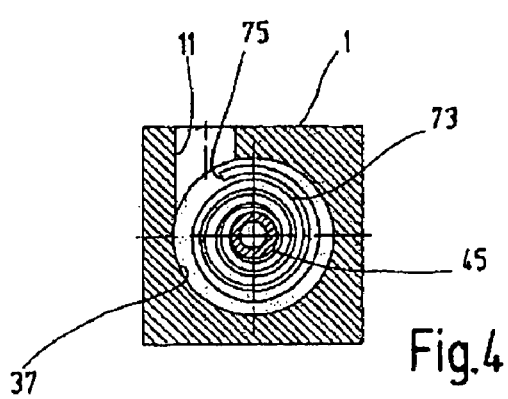

SYSTEM FOR GAS CLEANING

FIELD OF THE INVENTION

The present invention relates to a system for gas cleaning having at least one housing with a first chamber into which the gas to be cleaned can flow and with a second chamber from which the cleaned gas emerges. Between these two chambers, a filter device is provided through which a gas can flow, and which has filter media both for separation of the solid particles and for dehydration of the gas by precipitation of coalesced liquid.

BACKGROUND OF THE INVENTION

Systems of this type are known to be designed to eliminate not only dirt due to solid loading, but also to remove the pertinent gaseous media. If the liquid particles coalesce on the filter device located within the housing. The systems are also called coalescers. These systems are often used in conjunction with exhaust gas-generating processes, where exhaust gas flows with comparatively high temperatures and optionally with very high pressures.

SUMMARY OF THE INVENTION

An object of the present invention is to provide a gas cleaning system having especially good cleaning action ensuring very extensive dehydration.

This object is basically achieved according to the present invention by a system having an arrangement for preliminary dehydration through which the gas flows before it flows into the actual coalescer housing. The gas is in the preconditioned state promoting residual dehydration by coalescence on the respective filter medium. This preconditioning yields extensive dehydration such that the cleaned gas can optionally be returned to the process.

Preferably, the arrangement for preliminary dehydration is located on or in the housing of the filter device.

In advantageous embodiments, the arrangement for preliminary dehydration has at least one cyclone. The use of a cyclone leads to a durable and reliable construction since no moving parts are necessary.

Embodiments in which the pertinent cyclone is integrated into the housing containing the coalescer is characterized by an especially compact construction.

The housing in the normal installation position preferably defines a longitudinal axis extending at least partially vertically. The first chamber is located in the lower section of the housing and is bordered laterally by a circular ring surface, preferably concentric to the longitudinal axis. On the housing, there can be an inflow opening for the gas to be cleaned, such that the gas is tangentially incident on the circular ring surface, so that the circular ring surface forms a cyclone for preliminary dehydration.

In these embodiments the housing on the lower end can be closed off by a collecting tank holding the liquid precipitated during preliminary dehydration.

Between the collecting tank and the circular ring surface of the cyclone, a floor part can form a drain funnel for the liquid precipitated on the cyclone as the lower boundary of the cyclone.

Preferably, the housing can hold a filter device extending along its longitudinal axis and made such that for the gas to be cleaned it provides an inner cavity surrounded by the filter media. Between the exterior wall and the inside wall of the housing, the second chamber is located which the cleaned gas enters after it has flowed out of the inner cavity of the filter device through the filter elements to the outside.

On the top end of the circular ring surface forming the cyclone the housing can have a floor separating the first chamber from the second chamber. On the floor, a seat is made forming a passage and receiving a connection sleeve of the filter device. The sleeve leads into the interior cavity of the filter device. Via the sleeve gas dehydrated beforehand flows from the cyclone into the cavity of the filter device.

Above this floor, that is, in the region belonging to the second chamber, the housing can have a widening forming a chamber for collection of the fluid coalesced on the filter device and removed from the chamber via an evacuation opening provided in the wall of the housing.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure:

FIG. 2 is a front elevational view in section of one coalescer housing of FIG. 1, drawn schematically simplified;

FIG. 3 is a rear elevational view in section similar to FIG. 2, but with the coalescer housing being turned by 180° relative to FIG. 2 and being shown without the filter device located in it;

FIG. 4 is a bottom plan view in section of the coalescer housing taken along line IV-IV of FIG. 3.

DETAILED DESCRIPTION OF THE INVENTION

Figure 1:
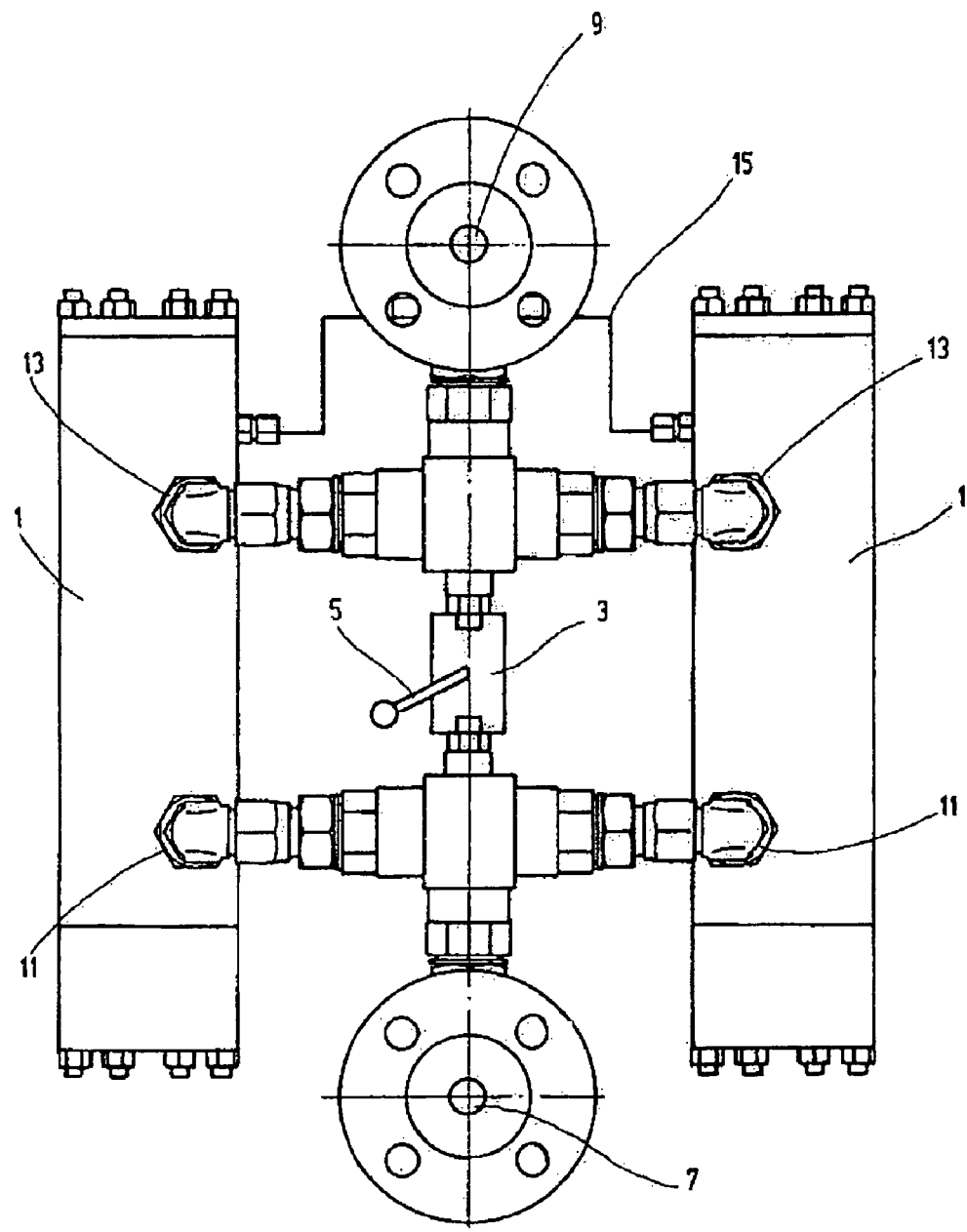
FIG. 1 is a front elevational view of a gas cleaning system according to one exemplary embodiment of the present invention with two coalescer housings which can be operated in alternation.

The present invention is explained below using an exemplary embodiment in which two coalescer housings 1 are used and are made identical, except for the arrangement of the housing openings which is in mirror image. A transfer fitting 3 in the manner conventional in the technology enables transfer of the gas flow supplied to the housings 1 and of the gas flow emerging from them is assigned to the housings 1 such that one housing 1 or the other is activated in alternation. As is to be seen in FIG. 1, the transfer fitting 3 as a control element has a transfer lever 5, depending on its operating position the gas flow being fed from an entry fitting 7 into one housing or the other, from which the gas flow is discharged via an exit fitting 9. The gas enters at the housings 1 each via one inflow opening 11. The cleaned gas flow emerges from the respective housing 1 via an outflow opening 13. A pressure equalization line 15 extends between the housings 1 in FIG. 1.

FIGS. 2 to 4 show details of one exemplary embodiment of the coalescer housing 1 usable in a system according to the present invention. As is apparent, the housing 1 is made as an elongated body which is square in cross-sectional outline, with a longitudinal axis 17. In the normal installation position of the housing 1, the longitudinal axis 17 is aligned vertically. On the top end, the housing 1 is closed by a cover part 19 screwed to it. Sealing elements 21 form a pressure-tight seal. A central vent opening 23 is in the cover part 19.

The housing 1, on the opposite, lower end, is closed off by a collecting tank 25 screwed to it. Likewise, sealing elements 27 form a pressure-tight seal between the collecting tank 25 and the housing 1. On the bottom, the collecting tank 25 has an evacuation opening 29.

The different longitudinal sections of the interior of the housing 1 are each made circularly cylindrical, with the interior of the housing 1 being divided fundamentally into two chambers, specifically a first chamber 31 connected to the inflow opening 11 into which the gas to be cleaned flows, and a second chamber 33 (FIG. 2) in which the cleaned gas which emerges from this second chamber 33 via the outflow opening 13.

The first chamber 31 and the second chamber 33 are separated from one another by a filter device 35 through which the gas can flow and which is schematically shown in FIG. 2 only in outline.

The part of the first chamber 31 which directly adjoins the inflow opening 11 forms a cyclone for preliminary dehydration of the gas. For this purpose the inflow opening 11 is aligned to an inner circular ring surface or cylindrical surface 37 of the housing 1 such that the gas flow entering via the inflow opening 11 is incident on the circular ring surface 37 creating a cyclone effect. The cyclone effect causes preliminary dehydration as a result of the centrifugal forces acting on the flow which is flowing along the circular ring surface 37.

As shown by FIGS. 2 and 3, between the top end of the collecting tank 25 and the lower end of the circular ring surface 37 of the cyclone, a floor part 39 for the cyclone forms a floor which is recessed in the manner of a funnel with a central drain opening 41. Via opening 41, liquid precipitated in the cyclone drains into the collecting tank 25.

Above the circular ring surface 37, the housing 1 has a floor 43 separating the first chamber 31 from the second chamber 33. A seat 47 on floor 43 forms a passage 45 and a receiver for the connection sleeve 48 (see FIG. 2) of the filter device 35. This connection sleeve 48 leads into the inner cavity of the filter device 35 so that the gas which has been dehydrated beforehand in the cyclone travels from the cyclone into the interior of the filter device 35.

As has been shown, especially good dehydration action of the cyclone occurs when a relief-like profile in the form of a spiral is on the wall bordered to the top by the cyclone chamber or flow chamber. As is apparent from FIGS. 2 to 4, for this purpose the bottom side of the floor 43 bordering first flow chamber 31 to the top is not made with a smooth surface, but has a profile formed by a projecting rib 71 extending in a spiral with grooves between its turns. As FIG. 4 shows, the spiral 73 formed in this way extends helically, from its outer start 75 located on the inflow opening 11, to the inside and against the direction of cyclone flow on the circular ring surface 37. A configuration such as this promotes settling of droplets falling onto the floor part 39. Depending on the flow conditions, a different number of spiral turns is possible.

Figure 5:
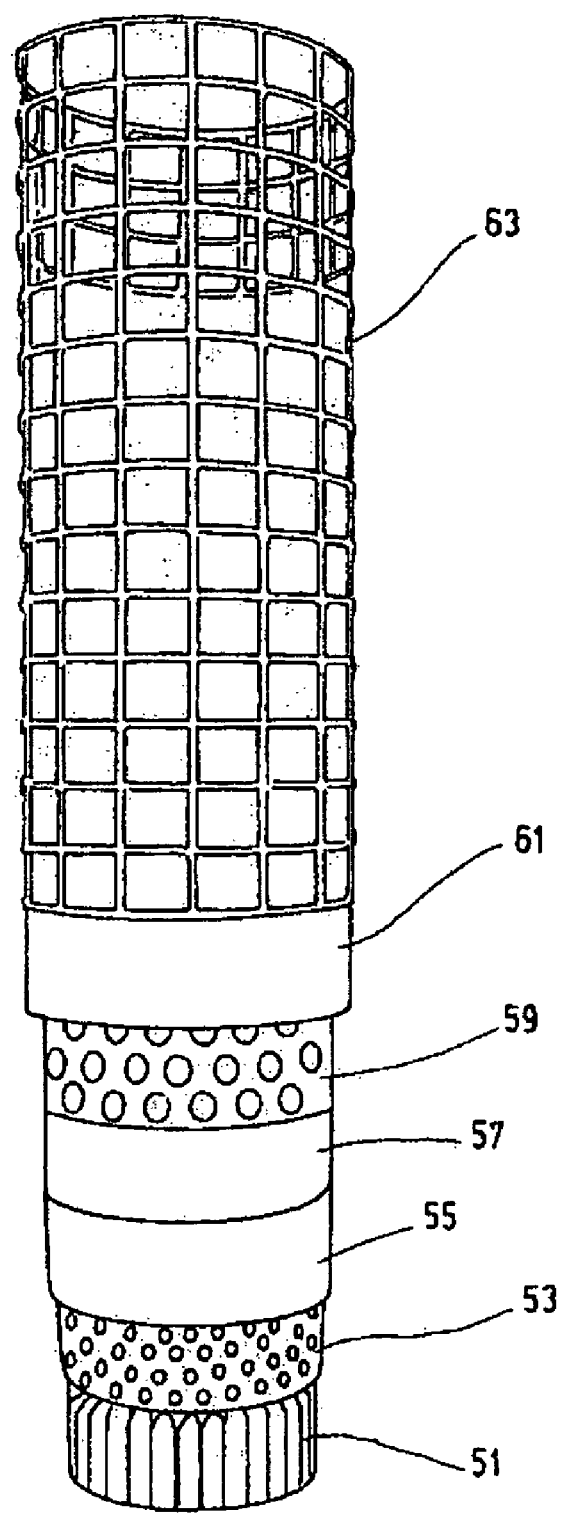
FIG. 5 is an exploded perspective view of the filter device which can be used for the system according to the present invention with only the filter media and stabilizing support elements being shown.

As is shown in FIG. 5, the inner cavity of the filter device 35 is surrounded by the filter media and support elements through which the gas dehydrated beforehand flows from the inside to the outside. The filter media is such that both precipitation of the solid particles and dehydration take place by precipitation of coalesced liquid. For this purpose, the filter device as inner layers 51 used for particle precipitation has wire cloth and filter paper folded into a star shape. To the outside a perforated sheet 53 adjoins for stabilization. About sheet 53 there is a glass fiber fabric 55 for coalescence. A wire cloth 57 for drainage follows, over which a perforated sheet 59 for stabilization is located. About sheet 59 is a needle felt 61 for draining the liquid. A metal basket 63 finally forms the outer enclosure of the unit.

As FIGS. 2 and 3 show, above the floor 43 in the housing 1, a widening belonging to or in the second chamber 33 forms a collection chamber 65 for collection of the liquid coalesced on the filter device 35. That fluid can be drained via a drain or evacuation opening 67. An opening 69 is designed and provided for connection of the pressure equalization line 15 (FIG. 1) in the upper region of the housing 1. Openings 23, 29, 67 and 69 additionally provided in the housing, besides the inflow opening 11 and the outflow opening 13, are each provided with pressure-tight fittings (not shown).

While the present invention is described using one example in which two coalescer housings 1 can be operated in alternation by actuating a transfer fitting 3, a different system structure with only one coalescer housing or a different number of housings can be provided. Instead of a cyclone integrated into the housing 1, preliminary dehydration could take place differently, for example, with one or more cyclones connected upstream from the housing. The use of cyclones connected next to one another can likewise be provided, especially in cases in which gas flows of different volumetric flows or different flow velocity must be handled.

While one embodiment has been chosen to illustrate the invention, it will be understood by those skilled in the art that various changes and modifications can be made therein without departing from the scope of the invention as defined in the appended claims.

What is claimed is:

1. A gas cleaning system, comprising:
   at least one housing having a first chamber for receiving gas to be cleaned and a second chamber for receiving and discharging clean gas, said housing having a floor separating said first and second chambers;
   a filter device extending along a longitudinal axis thereof in said housing and in fluid communication between said first and second chambers through which gas can flow, said filter device having filter media capable of precipitation of solid particles and of dehydration by precipitation of coalesced liquid of the gas passing therethrough and having an inner cavity surrounded by said filter media, said second chamber being between an exterior of said filter media and an inside wall of said housing;
   a preliminary gas dehydration cyclone upstream of said filter device provided by a circular ring surface laterally bordering said first chamber;
   a seat on said floor forming a passage receiving a connection sleeve on said filter device, said sleeve extending into said inner cavity of said filter device through which gas dehydrated by said dehydration cyclone flows from said dehydration cyclone into said inner cavity of said filter device; and
   a spiral formed from a rib projecting from a surface of said floor facing said first chamber and having grooves located therebetween.

2. A gas cleaning system according to claim 1 wherein said housing in a normal installation positions comprises a longitudinal axis extending at least partially vertical with said first chamber located in a lower section of said housing and with said circular ring surface concentric to said longitudinal axis of said housing.

3. A gas cleaning system according to claim 1 wherein said housing comprises an inflow opening for the gas to be cleaned tangentially incident to said circular ring surface.

4. A gas cleaning system according to claim 3 wherein said housing comprises a collecting tank on a lower end thereof to hold liquid precipitated during preliminary dehydration in said dehydration cyclone.

5. A gas cleaning system according to claim 4 wherein
a floor part is located between said circular ring surface and said collecting tank and has a drain funnel for liquid precipitated in said first chamber.

6. A gas cleaning system according to claim 1 wherein
said housing comprises a widening above said floor forming a collection chamber for collecting fluid coalesced on said filter device and an evacuation opening in a wall thereof through which liquid in said collection chamber can be removed from said housing.

7. A gas cleaning system according to claim 1 wherein
said spiral extends from an outer end thereof located adjacent an inflow opening tangentially incident to said circular ring surface in a direction opposite gas flow on said circular ring surface.

8. A gas cleaning system, comprising:
at least one housing having a longitudinal axis oriented substantially vertically, a first chamber for gas to be cleaned in a lower section of said housing and a second chamber for receiving and discharging clean gas, said first chamber being defined laterally by a cylindrical surface concentric to said longitudinal axis;
a filter device extending along said longitudinal axis in fluid communication between said first and second chambers through which gas can flow and having filter media surrounding an inner cavity capable of separating out solid particles and for dehumidifying gas by separating out coalesced liquid, said second cavity being between an outside of said filter device and an inner wall of said housing;
a gas pre-dehumidification cyclone within said housing formed by said cylindrical surface;
a collecting tank closing a lower end of said housing and receiving liquid separated during pre-humidification within said first chamber;
a floor on an upper end of said first chamber and separating said first and second chambers;
a seat on said floor forming a passage receiving a connecting sleeve of said filter device leading to said inner cavity of said filter device through which pre-dehumidified gas flows out of said cyclone into said inner cavity;
a widening in said housing above said floor forming a collection chamber for liquid coalesced on said filter device; and
an evacuation opening in a wall of said housing defining said collection chamber through which liquid in said collecting chamber can be removed from said housing.

9. A gas cleaning system according to claim 8 wherein
an inflow opening on said housing conducting gas to be cleaned against said cylindrical wall tangentially such that that gas forms a cyclone flow for dehumidification thereof.

10. A gas cleaning system according to claim 8 wherein
a floor part between said cylindrical surface and said collecting tank has a drain funnel for conveying liquid separated by said cyclone at a lower limit of said cyclone.

11. A gas cleaning system according to claim 8 wherein
a spiral rib projects from a lower side of said floor into an upper limit of said first chamber, and has grooves within said spiral rib.

12. A gas cleaning system according to claim 11 wherein
said spiral rib extends inwardly from an outer end thereof located adjacent an inflow opening on said housing conducting gas to be cleaned tangentially on said cylindrical surface such that that gas forms a cyclone flow, said spiral rib extending in a direction opposite said cyclone flow.

13. A gas cleaning system, comprising:
at least one housing having a first chamber for receiving gas to be cleaned and a second chamber for receiving and discharging clean gas, said housing having a floor separating said first and second chambers;
a filter device extending along a longitudinal axis thereof in said housing and in fluid communication between said first and second chambers through which gas can flow, said filter device having filter media capable of precipitation of solid particles and of dehydration by precipitation of coalesced liquid of the gas passing therethrough and having an inner cavity surrounded by said filter media, said second chamber being between an exterior of said filter media and an inside wall of said housing;
a preliminary gas dehydration arrangement upstream of said filter device provided by a circular ring surface laterally bordering said first chamber and an inflow opening for the gas to be cleaned arranged tangentially to said ring surface;
a seat on said floor forming a passage coupled to said filter device and in fluid communication with said inner cavity of said filter device through which gas dehydrated by said dehydration arrangement flows from said first chamber into said inner cavity of said filter device; and
a spiral formed from a rib projecting from a surface of said floor facing said first chamber and having grooves located therebetween.

14. A gas cleaning system according to claim 13 wherein
said housing in a normal installation positions comprises a longitudinal axis extending at least partially vertical with said first chamber located in a lower section of said housing and with said circular ring surface concentric to said longitudinal axis of said housing.

15. A gas cleaning system according to claim 14 wherein
a floor part is located between said circular ring surface and said collecting tank and has a drain funnel for liquid precipitated in said first chamber.

16. A gas cleaning system according to claim 13 wherein
said housing comprises a collecting tank on a lower end thereof to hold liquid precipitated during preliminary dehydration in said first chamber.

17. A gas cleaning system according to claim 13 wherein
said housing comprises a widening above said floor forming a collection chamber for collecting fluid coalesced on said filter device and an evacuation opening in a wall thereof through which liquid in said collection chamber can be removed from said housing.

18. A gas cleaning system according to claim 13 wherein
said spiral extends from an outer end thereof located adjacent an inflow opening tangentially incident to said circular ring surface in a direction opposite gas flow on said circular ring surface.

* * * * *